(12) United States Patent
Dudley

(10) Patent No.: US 10,033,682 B2
(45) Date of Patent: Jul. 24, 2018

(54) CLOUD-BASED DELIVERY NOTIFICATIONS FOR MESSAGING SYSTEMS

(71) Applicant: William Dudley, Lovettsville, VA (US)

(72) Inventor: William Dudley, Lovettsville, VA (US)

(73) Assignee: Sybase, Inc., Dublin, CA (US)

( * ) Notice: Subject to any disclaimer, the term of this patent is extended or adjusted under 35 U.S.C. 154(b) by 260 days.

(21) Appl. No.: 14/587,804

(22) Filed: Dec. 31, 2014

(65) Prior Publication Data

US 2016/0191443 A1    Jun. 30, 2016

(51) Int. Cl.
*G06F 15/16*  (2006.01)
*H04L 12/58*  (2006.01)

(52) U.S. Cl.
CPC .............. *H04L 51/24* (2013.01); *H04L 51/36* (2013.01); *H04L 51/32* (2013.01)

(58) Field of Classification Search
CPC ............................. H04L 51/24; G06Q 10/107
USPC .................................................. 709/206–245
See application file for complete search history.

(56) References Cited

U.S. PATENT DOCUMENTS

| | | | |
|---|---|---|---|
| 2007/0038714 A1* | 2/2007 | Sell ..................... | H04L 12/5885 709/206 |
| 2012/0117178 A1* | 5/2012 | Price ...................... | H04L 51/30 709/207 |
| 2012/0226759 A1* | 9/2012 | Lew .................. | H04L 29/12896 709/206 |
| 2013/0046834 A1* | 2/2013 | Barber ................ | H04L 12/6418 709/206 |

OTHER PUBLICATIONS

"3rd Generation Partnership Project; Technical Specification Group Terminals; Technical realization of the Short Message Service (SMS); (Release 5)", 3GPP TS 23.040 V5.8.1 (Oct. 2004), 2004, pp. 1-181.
"Inter-Connect SMS Gateway Implementation Guide, Version 1.0", SMS Forum, Dec. 12, 2002, pp. 1-15.
"Short Message Peer to Peer Protocol Specification v3.4, Document Version:—Issue 1.2", SMPP Developers Forum, Oct. 12, 1999, pp. 1-169.

* cited by examiner

*Primary Examiner* — David Lazaro
*Assistant Examiner* — Berhanu Shitayewoldetsadi
(74) *Attorney, Agent, or Firm* — Brake Hughes Bellermann LLP

(57) ABSTRACT

A message identifier collector may collect message identifiers identifying sent messages having been sent by originating devices and identifying received messages of the sent messages that have been received at corresponding recipient devices. A message identifier matcher may match a sent message identifier for a sent message of the sent messages with a received message identifier for a corresponding received message of the received messages at a corresponding recipient device, and a delivery notification generator may send a delivery notification to an originating device of the originating devices that originally sent the sent message, thereby indicating receipt of the message at the corresponding recipient device. A delivery notification network path along which the message identifiers and the delivery notification are sent is different from a message delivery network path along which the message is sent.

20 Claims, 9 Drawing Sheets

CLOUD-BASED DELIVERY NOTIFICATIONS FOR MESSAGING SYSTEMS

TECHNICAL FIELD

This description relates to delivery notifications for messaging systems.

BACKGROUND

When sending a message through virtually any type of messaging system, a message sender may wish to receive a delivery notification indicating a delivery status (e.g., successful or failed delivery) of the message being sent. Accordingly, many messaging systems do provide various types of delivery notifications, using various associated techniques. In many cases, however, the techniques for providing delivery notifications are inefficient or otherwise unsatisfactory.

For example, in the context of mobile device messaging, such as the Short Message Service (SMS), text messages are often sent from a subscriber of one mobile service provider to a subscriber of another mobile service provider. Such text messages are often sent over multiple network connections, including being routed between the mobile service providers using a third party service hub. It is possible to send delivery notifications for such text messages. However, existing techniques generally rely on some or all of the same network connections and service hub for the delivery notifications as are used for the corresponding text messages, themselves. As a result, if a group of text messages are sent with delivery notifications requested, a network capacity required may be effectively doubled as compared to sending just the messages themselves. For messaging systems that are already high-volume, such network capacity requirements may be untenable.

Nonetheless, in text messaging and many other messaging scenarios, delivery notifications may remain a high priority for individual and/or business message senders, as well as for messaging service providers. Consequently, an efficient, scalable, cost-effective, and reliable delivery notification service would be advantageous.

SUMMARY

According to one general aspect, a computer program product may be tangibly embodied on a non-transitory computer-readable storage medium and may comprise instructions that, when executed, are configured to cause at least one processor to receive a sent message identifier for a message sent by an originating device over a message delivery network path, the sent message identifier being received over a delivery notification network path that is different from the message delivery network path, and receive, over the delivery notification network path, a received message identifier indicating receipt of the message at a recipient device over the message delivery network path. The instructions, when executed, may be further configured to cause the at least one processor to execute a matching of the received message identifier with the sent message identifier, and send, based on the matching, a delivery notification to the originating device, over the delivery notification network path.

According to another general aspect, a computer-implemented method for executing instructions stored on a non-transitory computer readable storage medium may include receiving a sent message identifier for a message sent by an originating device over a message delivery network path, the sent message identifier being received from a first delivery notification client configured to detect a delivery notification request in association with the message and send the sent message identifier over a delivery notification network path that is different from the message delivery network path, based thereon. The method may further include receiving a received message identifier, over the delivery notification network path and from a second delivery notification client configured to detect an acknowledgement of receipt of the message at a recipient device, the received message identifier indicating receipt of the message at the recipient device over the message delivery network path, The method may further include executing a matching of the received message identifier with the sent message identifier, and sending, based on the matching, a delivery notification to the originating device, over the delivery notification network path and including the first delivery notification client.

According to another general aspect, a system may include at least one processor, and instructions recorded on a non-transitory computer-readable medium, and executable by the at least one processor. The system may include a message identifier collector configured to cause the at least one processor to collect message identifiers identifying sent messages having been sent by originating devices and identifying received messages of the sent messages that have been received at corresponding recipient devices. The system may further include a message identifier matcher configured to cause the at least one processor to match a sent message identifier for a sent message of the sent messages with a received message identifier for a corresponding received message of the received messages at a corresponding recipient device, and a delivery notification generator configured to send a delivery notification to an originating device of the originating devices that originally sent the sent message, thereby indicating receipt of the message at the corresponding recipient device. A delivery notification network path along which the message identifiers and the delivery notification are sent is different from a message delivery network path along which the message is sent.

The details of one or more implementations are set forth in the accompanying drawings and the description below. Other features will be apparent from the description and drawings, and from the claims.

DETAILED DESCRIPTION

Figure 1:
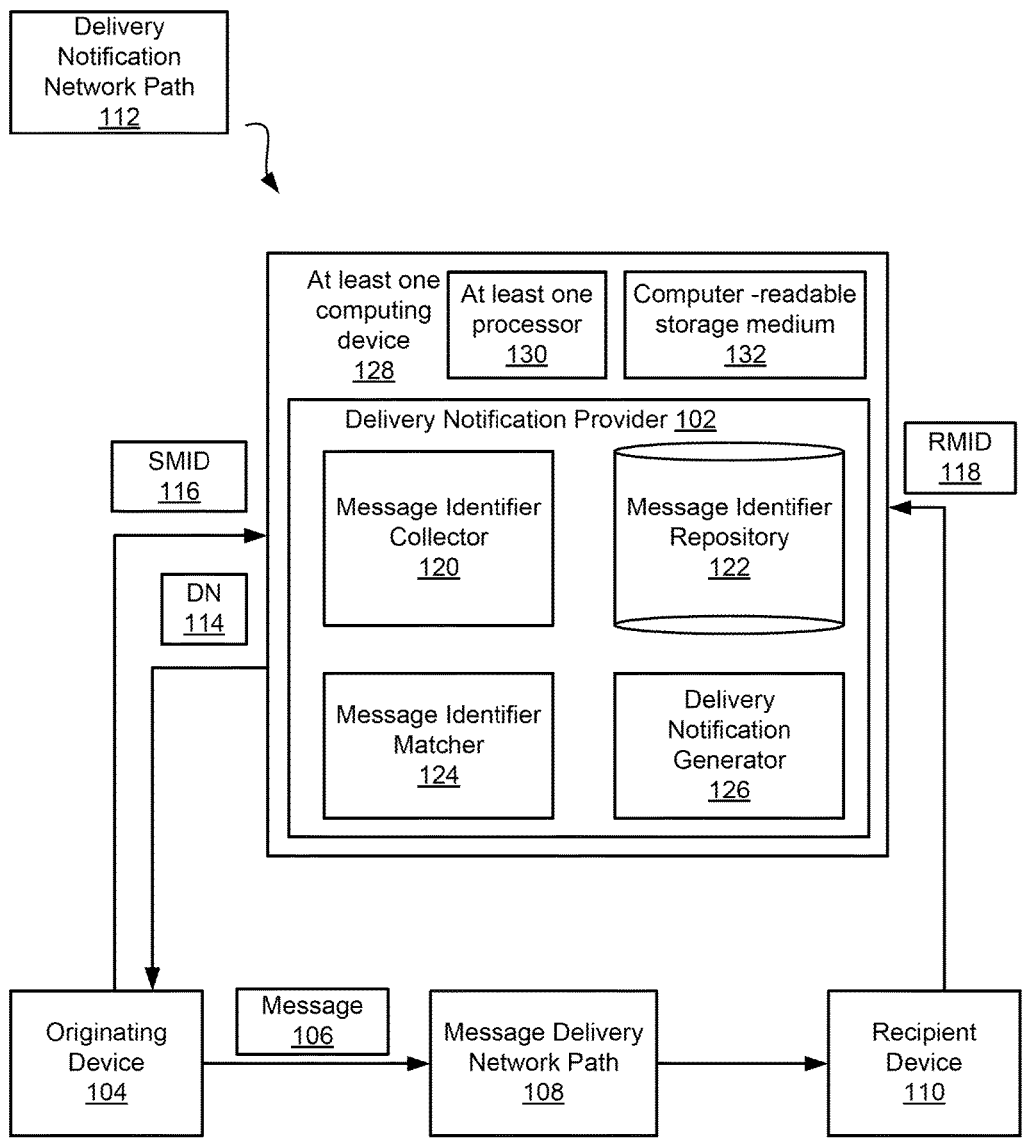
FIG. 1 is a block diagram of a system for cloud-based delivery notifications for messaging systems.

FIG. 1 is a block diagram of a system 100 for cloud-based delivery notifications for messaging systems. In the example of FIG. 1, a delivery notification provider 102 is configured to provide a delivery notification service for an originating device 104 sending a message 106, by way of a message delivery network path 108, to a recipient device 110. More specifically, as illustrated in FIG. 1 and described in detail below, the delivery notification provider 102 is positioned within a delivery notification network path 112 that is partially or completely independent of the message delivery network path 108. In this way, a specific delivery notification 114 for the message 106 may be sent to the originating device 104, while minimizing or eliminating a need to consume network resources of the message delivery network path 108. Consequently, a user of the originating device 104 may be provided with the delivery notification 114, which confirms a receipt status of the message 106 at the recipient device 110 for the user of the originating device 104, in a fast and reliable manner. Meanwhile, an operator or other users of the message delivery network path 108 benefit from a reduction of a consumption of network resources that may otherwise occur if the delivery notification 114 were provided by conventional means.

In the example of FIG. 1, it is assumed that the originating device 104 represents virtually any computing device capable of participating in a messaging system designed to facilitate delivery of the message 106 through the message delivery network path 108. Similarly, then, the recipient device 110 should be understood to represent virtually any compatible computing device that may be configured to receive the message 106 by way of the message delivery network path.

Thus, by way of non-limiting example, the devices 104, 110 may represent virtually any cellphone, smartphone, tablet, netbook, notebook, laptop, or any other type of suitable mobile computing device. In some implementations, one or both of the devices 104, 110 also may represent a desktop computer, workstation, or any computing device not designed to be portable or mobile, but designed to be compatible with a messaging system for receiving the message 106, including network-adapted devices of any sort, including, e.g., television.

Further in the example of FIG. 1, it will be appreciated that the message delivery network path 108 conceptually represents and includes any network components of a particular messaging system used to transport the message 106, along with the various network interconnections used to transport the message 106 between such messaging system components. For example, as described and illustrated in more detail below with respect to FIG. 3, the message delivery network path 108 may include various messaging system components, such as a service provider for providing services to the user of the originating device 104, a service provider providing services to the user of the recipient device 110, and a service hub facilitating interactions between the two service providers (including the relaying of the message 106 there between).

Of course, FIG. 1 is intended merely as a simplified example designed to facilitate explanation and understanding of the operations of the delivery notification provider 102. In practice, the message delivery network path 108 may be used to implement a messaging system for delivering a large number of messages between many different devices, where the devices may be serviced by a variety of service providers. Thus, FIG. 1 should be understood to represent any example scenario in which a high volume, high speed messaging system seeks to deploy network resources in an efficient, scalable manner, and which would benefit from the use of the delivery notification provider 102 in these efforts.

Specifically, as referenced above, it may be the case that the messaging system of the message delivery network path 108 includes features and functions for providing delivery notifications to the user of the originating device 104 for the message 106, where the user of the originating device 104 and/or an authorized operator of the messaging system in question, may have the ability to select an option for a delivery notification. However, as referenced above and described in detail below, e.g., with respect to FIG. 5, the use of such conventional delivery notification techniques typically rely on consumption of network resources of the message delivery network path 108.

Specifically, for example, such conventional delivery notification techniques may simply return a delivery notification based on message delivery at the recipient device 110, using essentially the same network resources used to send the message in question in the first place. Thus, for each message in such a conventional messaging system requiring delivery of a corresponding delivery notification, network resources consumed would be approximately double as compared to a scenario in which the message does not require a delivery notification. Moreover, some messaging systems do not currently offer the possibility of delivery notifications, or do not offer true end-to-end delivery notifications, at least partly for the reasons referenced above.

In contrast, in the example of FIG. 1, the delivery notification provider 102 is positioned within the delivery notification network path 112, which, as described, is largely or completely independent of the message delivery network path 108. Consequently, delivery of the delivery notification 114 need not consume network resources of the message delivery network path 108, thereby leaving those network resources available for efficient, cost-effective, reliable, and scalable delivery of messages, such as the message 106, even when the message delivery network path 108 is used to deliver billions of such messages.

Types of messaging systems that may benefit from these features of the delivery notification provider 102 may thus include, for example, virtually any type of messaging system that would be compatible with the types of devices and messages referenced above. For example, such messaging systems may include well-known email or text messaging systems, as well as related or more specialized messaging systems, such as messaging systems of social media websites, or over the top (OTT) messaging systems that are designed to require downloading of a specific messaging application on all devices 104, 110 wishing to participate in corresponding message exchanges.

All such messaging systems may be understood to utilize corresponding messaging protocols and other associated techniques for routing messages through the message delivery network path 108. Moreover, to the extent that the messaging system of the message delivery network path 108 is to be understood broadly as just described, it will be further appreciated that messages sent thereon, including the message 106, may similarly be understood to represent virtually any type of message that an underlying messaging system is configured to transmit. For example, in addition to simple text messages and emails, such messages may include multimedia messages including photos or videos, messages including audio files, or other types of content.

Within the message delivery network path 108 itself, network connections may be established using any appropriate type of network resource suitable for transmitting a given message type of the messages referenced above. For example, the public Internet may be used to establish such network connections, including virtual private networks (VPNs) established using the public internet. In other example implementations, more specialized networks may be utilized. For example, a service provider, such as a mobile service provider, of the originating device 104 may implement its own network for executing telephone calls, text messaging, and other services intended to support subscribers of the mobile service provider in question. Similarly, of course, it may occur that a different mobile service provider providing services for the recipient device 110, may utilize its own specialized network. As described herein, the message delivery network path 108 may include a service hub for facilitating message exchanges between the otherwise different provider-specific networks, where the service hub may be connected to the provider-specific networks using the public internet, or other suitable techniques.

In general, then, it will be appreciated from the above description that FIG. 1 is intended generally to represent all current and future types of messaging systems, and associated protocols, messages, applications, and devices, particularly those executing in a packet-switched network or other context in which messaging is performed asynchronously and message delivery may, even if only in rare circumstances, suffer from partial or complete delivery failure.

Inasmuch as such messaging systems and related features are assumed to be well-known, they are not necessarily described herein in great detail, except as may be necessary or helpful in understanding operations of the system 100 of FIG. 1. Instead, for purposes of providing a specific example for explaining operations of the system 100 of FIG. 1, the following description provides a number of examples in which the messaging system of the message delivery network path 108 includes the short message service (SMS). More specifically, the following description frequently refers to examples of the types just referenced, in which multiple mobile service providers implementing an SMS messaging system communicate with one another on behalf of their respective subscribers, and utilizing a third-party service hub, in order to facilitate message exchanges between the individual mobile devices of the various subscribers.

In such examples, the various mobile service providers also may be referred to as mobile network operators (MNOs), and may implement any associated or required messaging protocol, such as the short message peer-to-peer (SMPP) protocol, which is currently the standard internet protocol (IP) based inter-operator protocol. In such contexts, as in many of the various messaging systems referenced above, messages may be transmitted person to person between individual users, or may be transmitted from an application to a mobile device of a user (sometimes referred to as application-to-peer (A2P) messaging).

In the more general example of FIG. 1, as illustrated, the delivery notification provider 102 is configured to receive a sent message identifier (SMID) 116 that is sent in conjunction with an original sending of the message 106. In the simplified example of FIG. 1, the SMID 116 is illustrated as originating from the originating device 104 itself, which may occur in some implementations. In other implementations, however, the SMID 116 should be more generally understood to be generated on behalf of the originating device 104, perhaps by an application associated with the delivery notification provider 102 and installed at the originating device 104, or by a mobile network operator providing services to the originating device 104, including messaging services. More specific examples and techniques for such indirect generation of the SMID 116 on behalf of the originating device 104 in conjunction with origination of the message 106 is provided below, e.g., with respect to the example of FIG. 3.

Somewhat similarly, upon receipt of the message 106 at the recipient device 110, the delivery notification provider 102 may receive a received message identifier (RMID) 118. As just described with respect to the SMID 116, the RMID 118 may be sent by the recipient device 110, by an application of the delivery notification provider 102 installed thereon, or by a mobile network operator of the recipient device 110 (which itself may utilize a specialized application associated with the delivery notification provider 102 to send the RMID 118). Again, specific techniques for sending the RMID 118 on behalf of the recipient device 110 are provided below, with respect to FIG. 3, or would be apparent.

Within the delivery notification provider 102, a message identifier collector 120 may be configured to receive the SMID 116, and may be further configured to store the SMID 116 within a message identifier repository 122. At a later time, upon receipt of the message 106 at the recipient device 110, the message identifier collector 120 may receive the RMID 118. At that time, the message identifier collector 120 may similarly store the RMID 118 within the message identifier repository 122.

In practice, and as described in more detail below, the message identifier collector 120 may collect additional information regarding the message 106 in conjunction with receipt of the SMID 116 and/or the RMID 118. For example, the message identifier collector 120 may receive various types of message metadata regarding the message 106, including, for example, timestamps indicating a time of sending or a time of receipt, size data indicating a size of the message in question, or various other types of information characterizing the message 106 and/or its transportation via the message delivery network path 108, and including information related to the originating device 104, the recipient device 110, or users thereof.

Then, a message identifier matcher 124 may be configured to analyze a message identifier repository 122 and determine a correspondence between the SMID 116 and the RMID 118. That is, chronologically, the SMID 116 should be received at a first point in time, in conjunction with the sending of the message 106, while the RMID 118 should be received at a later point in time, corresponding to a time of receipt of the message 106 at the recipient device 110. Therefore, over time, the message identifier matcher 124 must wait until such time that the RMID 118, matching the already-stored SMID 116, arrives and is stored at the message identifier repository 122. For example, the message identifier collector 120 may notify the message identifier matcher 124 of receipt of the RMID 118, thereby causing the message identifier matcher 124 to analyze the message identifier repository 122. In other example implementations, the message identifier matcher 124 may have some other technique for receiving notification of receipt of the RMID 118, and/or may check the message identifier repository 122 on a regular basis, in order to determine any new match of a SMID/RMID stored within the message identifier repository 122. In addition to determining a simple match or other correspondence of the individual identifiers, the message identifier matcher 124 may utilize the various types of message metadata that may be included with the SMID 116 and/or the RMID 118, in order to determine correspondence therebetween.

In any case, once such correspondence (e.g., matching) is determined, a delivery notification generator 126 may generate and send the delivery notification 114 to the originating device 104. In the simplest case, the delivery notification 114 may be the same or substantially similar to existing types of delivery notifications, and including reference to delivery receipts.

For example, the delivery notification 114 may be provided within a user interface of the originating device 104 in conjunction with a saved copy of the message 106, so that the user of the originating device 104 is immediately aware that the delivery notification applies to a message 106. Again, in a simple scenario, a delivery notification 114 may provide a simple notification of delivery of the message 106, perhaps including a timestamp at which delivery occurred. In other examples, some of which are referenced below, the delivery notification 114 may provide additional or alternative information. For example, the delivery notification 114 may indicate whether the message 106 was opened by the user of the recipient device 110, or may provide additional information regarding actions of the user of the recipient device 110. In still other implementations, the delivery notification 104 may indicate a delivery failure (partial or complete), which may occur, for example, when the message identifier matcher 124 waits some predetermined amount of time and does not detect an expected RMID 118 within the message identifier repository 122.

In the example of FIG. 1, the delivery notification provider 102 is illustrated as being executed using at least one computing device 128, which itself includes at least one processor 130 and a non-transitory computer readable storage medium 132. In other words, FIG. 1 illustrates that the delivery notification provider 102 may be implemented using appropriate hardware, or appropriate virtual machine executing on such hardware, that is part of the delivery notification network path 112. For example, as described in detail below, the at least one computing device 128 may represent a cloud-based server that is available, e.g., on the public Internet, and that is operable to communicate with either devices such as the devices 104, 110, and/or with mobile network operators providing services to the devices 104, 110. In more specific examples, the at least one computing device 128 may similarly be configured to communicate with a service hub or other component within the message delivery network path 108.

Thus, FIG. 1 illustrates that the delivery notification provider 102 may be provided by a third-party provider, such as an inter-operator vendor. The delivery notification provider 102 may be implemented independently of an actual inter-operator messaging exchange, even when inter-operator messaging systems (e.g., SMS) are provided by a different inter-operator vendor than the provider of the delivery notification provider 102. Thus, the delivery notification provider 102 defines a new, cloud-based infrastructure to post and receive message-related notifications, separate from an inter-operator/vendor environment used to implement actual message exchanges, and without using the corresponding messaging protocols and network resources used to implement such message exchanges.

Of course, the at least one computing device 128 is merely a highly-simplified, conceptual representation of the types of computing devices that may be utilized to implement the delivery notification provider 102. For example, the at least one computing device 128 may include two or more computing devices in communication with one another. The at least one processor 130 may represent two or more processors of any such computing device, executing in parallel to provide the delivery notification provider 102, utilizing corresponding instructions stored using the non-transitory computer readable storage medium 132. Of course, similarly, the non-transitory computer readable storage medium 132 may represent one or more different types of memory utilized by the at least one computing device 128. In addition to storing instructions which allow the at least one processor 130 to implement the delivery notification provider 102, the non-transitory computer readable storage medium 132 may be used to store data, such as data of the message identifier repository 122.

Further, in the example of FIG. 1, the delivery notification provider 102 is illustrated as a single component, which itself includes individual subcomponents 120-126. Of course, it will be appreciated that, in various alternative implementations, any one of the subcomponents 120-126 may be implemented using two or more additional subcomponents, while, conversely, any two of the illustrated subcomponents 120-126 may be implemented as a single subcomponent. Thus, many variations of the delivery notification provider 102 may be implemented for the purpose of providing cloud-based delivery notifications for messaging systems.

Figure 2:
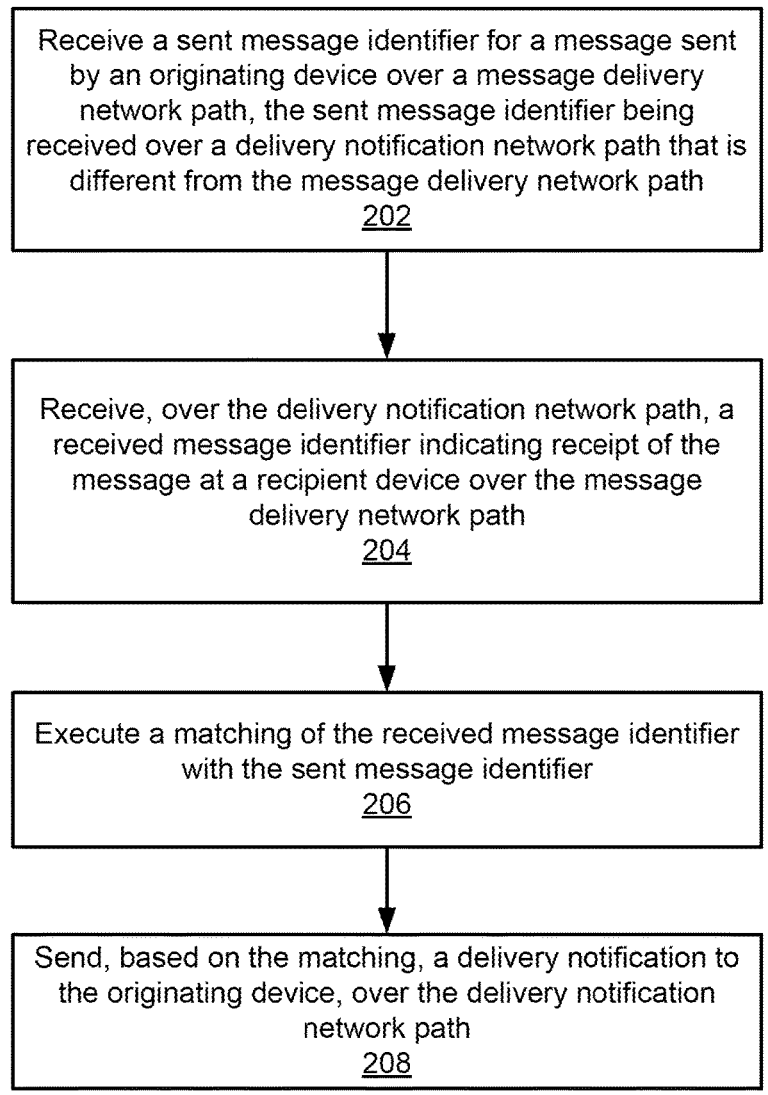
FIG. 2 is a flowchart illustrating example operations of FIG. 1.

FIG. 2 is a flowchart 200 illustrating example operations of the system 100 of FIG. 1. In the example of FIG. 2, operations 202-208 are illustrated as separate, sequential operations. However, in various implementations, the flowchart 200 may include one or more additional or alternative operations, and/or one or more of the operations 202-208 may be omitted. In all such implementations, any two or more included operations or sub-operations may be performed in a partially or completely overlapping or parallel manner, or in a nested, iterative, looped, or branched fashion.

In the example of FIG. 2, a sent message identifier may be received for a message sent by an originating device over a message delivery network path, the sent message identifier being received over a delivery notification network path that is different from the message delivery network path (202). For example, with respect to the delivery notification provider 102, the message identifier collector 120 may collect the SMID 116 from, or on behalf of, the originating device 104. As shown and described, the SMID 116 may be received over the delivery notification network path 112, which is different from the message delivery network path 108 over which the message 106 corresponding to the SMID 116 is transmitted.

A received message identifier indicating receipt of the message at a recipient device over the message delivery network path may be received over the delivery notification network path (204). For example, with respect to FIG. 1, the message identifier collector 120 may receive the RMID 118 from, or on behalf of, the recipient device 110. As described, the RMID 118 may indicate a successful receipt of the message 106 at the recipient device 110, or, as appropriate, may indicate a failure of the message 106 to be delivered successfully at the recipient device 110. Again as shown in FIG. 1, the RMID 118 may be received at the delivery notification provider 102 by way of the delivery notification network path 112, and separately from the message delivery network path 108.

A matching of the received message identifier with the sent message identifier may be executed (206). For example, the message identifier matcher 124 may match the SMID 116 and the RMID 118 from within the message identifier repository 122.

Based on the matching, a delivery notification may be sent to the originating device, over the delivery notification network path (208). For example, the delivery notification generator 126 may generate and send the delivery notification 114 to the originating device 104. In practice, the delivery notification 114 may be sent to other locations, as well, such as to a mobile network operator providing local services to the originating device 104, or to any other authorized user having access to the delivery notification network path 112.

Thus, the delivery notification provider 102 and the delivery notification network path 112 are operable to remove mobile and social message notifications of delivery (and other delivery-related information, such as typing indicators, as described herein) out of a main messaging delivery pathway, to thereby reduce the need and load of existing messaging infrastructures. Such techniques for providing delivery notifications are primarily described herein as being targeted for global and national SMS messaging ecosystems. However, the described techniques may be used in a variety of situations. Accordingly, a simple to integrate notification environment may be provided on top of an existing, high volume messaging ecosystem, including person-to-person (P2P) or application-to-person (A2P) messages. Further, as described, the delivery notification provider 102 may be deployed and managed by an intermediary third-party, on behalf of two or more mobile network operators, and may be built independently of the messaging medium or delivery protocols and mechanisms otherwise used within the relevant messaging system. Various implementations may support SMS protocols, as well as other messaging systems (e.g., social messaging systems) that may be based on non-based protocols (e.g., OTT messaging), as referenced herein.

Nonetheless, notwithstanding the wide applicability of the system and methods of FIGS. 1 and 2, and as described above, the following description is provided primarily with respect to the example of traditional mobile messaging, and which, as referenced above with respect to FIGS. 1 and 2, message senders and receivers typically each utilize a corresponding mobile device, where each such mobile device is connected to a mobile network operator (MNO) served, e.g., by cellular radio, and often extended by various Wi-Fi networks that the various users of the various mobile devices may encounter. As also referenced above, and described in more detail below with respect to FIG. 3, such messages sent between MNOs may utilize a messaging hub, also referred to as a service hub or other appropriate name, which is configured to route messages from one MNO to another, based, e.g., on a destination address (e.g., based on a phone number of the recipient device) using an appropriate table lookup or other technique within the messaging hub. As is known, and as also referenced above, the independent protocol SMPP may be utilized to enable such interoperability on MNOs, e.g., for SMS messaging. However, the delivery notification provider 102 is capable of providing the delivery notification 114, without requiring use of the SMPP protocol in the context of SMS and other related messaging systems.

Figure 3:
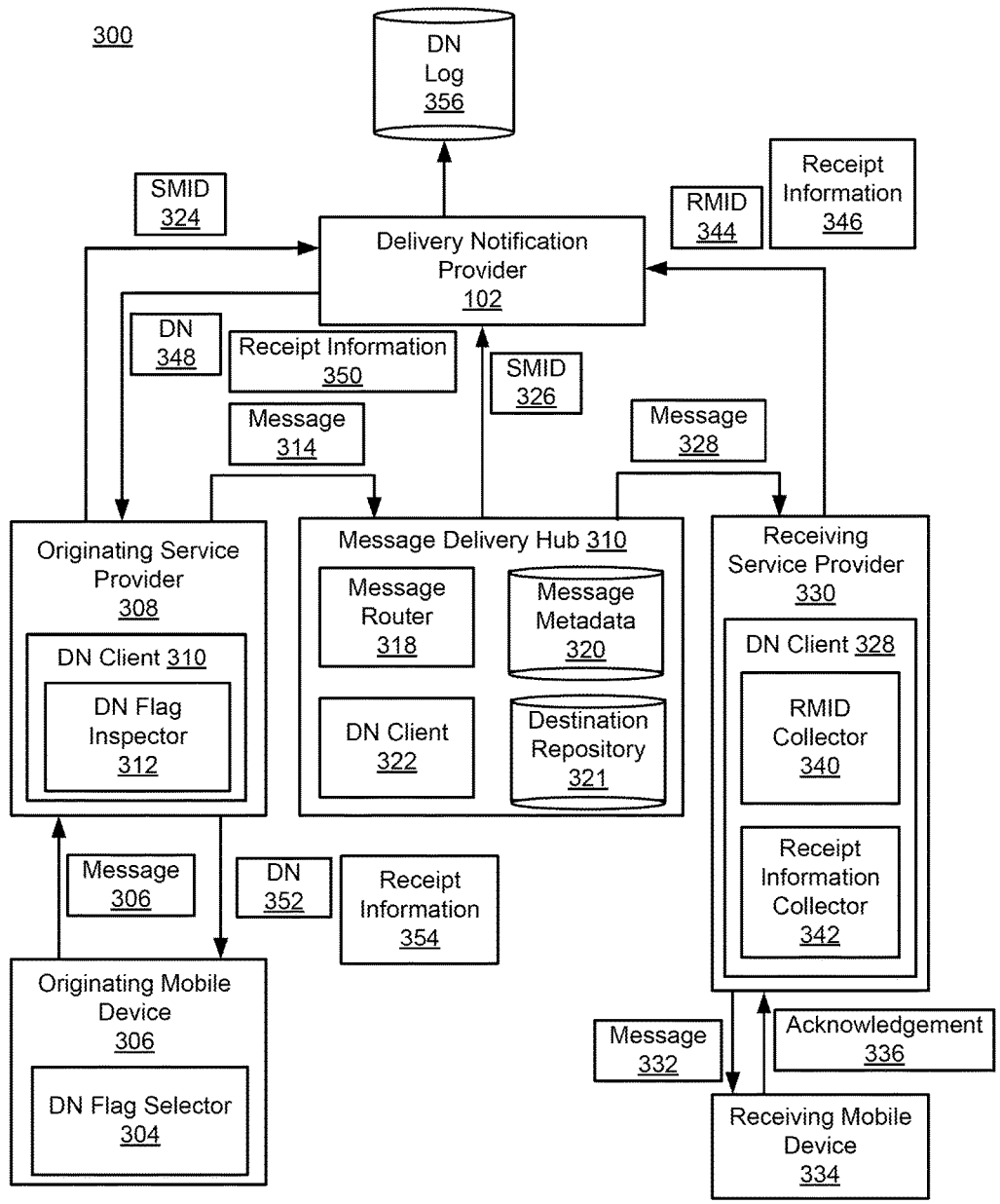
FIG. 3 is a block diagram of a more detailed example implementation of the system of FIG. 1.

Thus, FIG. 3 illustrates a block diagram of a system 300 used to implement system 100 of FIG. 1 in the context of SMS messaging systems, and related or similar messaging systems. In the example of FIG. 3, an originating mobile device 302 corresponds generally to the originating mobile device 104 of FIG. 1, and additionally illustrates a delivery notification flag selector 304. That is, the DN flag selector 304 represents any functionality associated with the originating mobile device 302 that enables a user of the originating mobile device 302 to request delivery of a delivery notification for a message being sent, illustrated in the example of FIG. 3 as a message 306.

In other words, for purposes of FIG. 3, the DN flag selector 304 may be considered to be an otherwise-conventional component for enabling a user to choose whether a given message should require a delivery notification or not. As also described, such conventional techniques for requesting a delivery notification are typically implemented in scenarios in which the message delivery network path of the message 306 (corresponding to the message delivery network path 108 of FIG. 1) is also used to provide a corresponding delivery notification. In contrast, in FIG. 3, and as appreciated from the above description of FIG. 1, the DN flag selector 304 may simply represent a conventional delivery notification selection technique that is leveraged by the system 300, in order to provide the type of cloud-based delivery notifications described herein. Of course, in alternative examples, the DN flag selector 304 may represent a component that is separate from, or in addition to, conventional DN flag selection techniques. In all such scenarios, practically speaking, the DN flag may represent, for example, a bit or flag set within message metadata that is sent in conjunction with the message 306. Again, for alternate messaging protocols, other techniques may be used to request a delivery notification for the message 306, but for purposes of the present example based on SMS messaging, it is assumed that standard features for requesting a delivery notification may be leveraged by the system 300 of FIG. 3.

In the example of FIG. 3, the message 306, along with the designated DN flag selection, may be sent to an originating service provider 308. In this context, of course, the originating mobile device 302 may be one of many mobile devices of corresponding subscribers of the originating service provider 308. Since such subscribers may be geographically disbursed over a wide area, the originating service provider 308 will typically have many different network stations across the geographical area in question, so that, as well-known, the originating mobile device 302 will typically communicate with a closest one of such network stations, and the receiving network station may transmit the received message 306 to a central, aggregating network location. In other words, the originating service provider 308 should be understood to represent potentially two or more network stations within an overall mobile network and associated mobile network operator.

In addition, in the example of FIG. 3, the originating service provider 308 is illustrated as including a delivery notification (DN) client 310, which itself includes a DN flag inspector 312 is configured to inspect the message 306 and associated message metadata to determine whether the DN flag selector 304 of the originating mobile device 302 has been utilized to request a delivery notification for the message 306.

In FIG. 3, the originating service provider 308 for the message 306 as message 314 to a message delivery hub 316. That is, it will be appreciated that the illustrated message 314 corresponds to the message 306, but is enumerated differently therefrom in FIG. 3 in order to more easily distinguish between different segments of the message delivery network path of FIG. 3. At the message delivery hub 316, a message router 318 may perform conventional message routing functions, including storing conventional message metadata 320, and including forwarding the message 314 based on a destination repository 321. That is, as referenced above, the destination repository 321 may include a number of telephone numbers or otherwise destination addresses for various subscribers of various service providers which are also contracting with the provider of the message delivery hub 316 to enjoy the benefits of inter-operator messaging delivery. In other words, as referenced above and as well-known, the message delivery hub 316 provides a service to a plurality of service providers or network operators, by maintaining a listing of all various phone numbers of various subscribers of the various service providers, so as to thereby enable message routing between individual subscribers of different mobile networks. In so doing, the message delivery hub 316 saves each of the contracting service providers from the effort of maintaining all such phone numbers for all such corresponding service providers, and of being responsible for forwarding messages to all such service providers directly.

In addition, as also illustrated in FIG. 3, the message delivery hub 316 may itself include a DN client 322, corresponding generally to the DN client 310 of the originating service provider 308. As described in detail herein, the DN clients 310, 322 generally represent software (e.g., and appropriate interface) for communicating a sent message ID to the delivery notification provider 102. In other words, the DN clients 310, 322 generally represent light-weight software installed at the originating service provider 308 and/or the message delivery hub 316, in conjunction with an expectation of operations of the delivery notification provider 102 in providing cloud-based delivery notifications for the types of messaging systems illustrated in FIG. 3.

For example, as shown, the DN client 310 may forward an SMID 324 to the delivery notification provider 102. In additional or alternative implementations, the message delivery hub 316, using the DN client 322, also may send an SMID 326 to the delivery notification provider 102.

Of course, in operation, the originating service provider 308 may be responsible for forwarding many millions or billions of messages to the message delivery hub 316 within a given timeframe, where many of these messages will not necessarily request a delivery notification to be provided therefore. Thus, the DN flag inspector 312 is operable to make an initial determination, based on an inspection of a DN flag field of the message 306, as described herein, whether a delivery notification has been requested. If so, the DN client 310 may proceed to send the SMID 324 to the delivery notification provider 102. In the example, the DN client 310 may represent a small requirement on network resources of the originating service provider 308, since, for example, the originating service provider 308 may be required to install the DN client 310 at an appropriate network location. As may be appreciated from the present description, the use of the DN client 310 at the originating service provider 308 may be relatively straightforward, while requiring very few network resources of the originating service provider 308, all while providing the various features and advantages of the cloud-based delivery notification techniques described herein.

Nonetheless, for the sake of non-limiting example, FIG. 3 also illustrates that the DN client 322 may be implemented at the message delivery hub 316, and may similarly be responsible for inspecting a delivery notification flag of the, in this case, message 314. Of course, in the various examples in which the DN client 322 is utilized instead of the DN client 310, even more of the small requirements imposed by the DN client 310 at the originating service provider 308 may be avoided, at a potential cost of including the message 314 within a further portion of the underlying message delivery network path. In other words, the installation and use of the DN client 310 at the originating service provider 308, as compared to the installation and use of the DN client 322 at the message delivery hub 316, generally represents a design choice on a part of the designer of the system 300, and, in both cases, the SMID 324 or the SMID 326 may be published (e.g., using the hypertext transfer protocol (HTTP) post command, or other suitable publishing technique) to the delivery notification provider 102.

Along the message delivery network path of the message 306, the message delivery hub 316 may forward the message 306/message 314, as shown by message 328, to a receiving service provider 330. That is, as described, the message router 318 may utilize the message metadata 320 and the destination repository 321 to forward the message 328 to the receiving service provider 330. Thereupon, the receiving service provider 330 may proceed to transmit the message 328 as the message 332 to a receiving mobile device 334. Upon receipt, the receiving mobile device 334 may send back an acknowledgement 336 to the receiving service provider 330. The use of the acknowledgement 336, by itself, is generally known, so that the acknowledgement 336 provides information to the receiving service provider 330 regarding a delivery, or lack thereof, of the message 332.

In this regard, as is known, and as described above with respect to the originating mobile device 302 and the originating service provider 308, the receiving mobile device 334 may represent a large number of mobile devices serviced by the receiving service provider 330 across a wide geographical area. Accordingly, the receiving service provider 330 may represent two or more network stations managed by the receiving service provider 330 in receiving acknowledgements such as the acknowledgement 336. In other words, the acknowledgement 336 represents intra-network techniques at the receiving service provider 330, that the mobile network operator for the mobile network being used by the receiving mobile device 334 may utilize, but which is conventionally insufficient or suboptimal for use as a basis for providing a conventional delivery notification to the originating mobile device 302.

Instead, in order to provide cloud-based, inter-operator delivery notifications, the receiving service provider 330 also includes a DN client 338. As shown, the DN client 338 may include an RMID collector 340, which is configured to determine an RMID 344 to be sent to the delivery notification provider 102, based on the acknowledgement 336. Also in the example of FIG. 3, the DN client 338 is illustrated as including a receipt information collector 342, which, as described in more detail below, may generally be configured to track additional information or metadata characterizing a receipt, or lack thereof, of the message 332 at the receiving mobile device 334. In other words, the receipt information collector 342 may be configured to determine information or metadata related to the received message 332, over and above a simple success/failure status of the message delivery. Accordingly, as shown, received information 346 may be provided by the DN client 338, along with the RMID 344, to the delivery notification provider 102. In this way, the user of the originating mobile device 302 may be provided with additional information characterizing receipt of the message 332, which, again, may be above and beyond a simple success/failure status indication. For example, the receipt information collector 342 and the received information 346 may relate to typing indicators or of action of the user of the receiving mobile device 334 that may be detected in conjunction with receipt or viewing of the message 332.

Then, as will be appreciated from the above description of FIG. 1, the delivery notification provider 102 may match the RMID 344 with the SMID 324. Based on this matching, the delivery notification provider 102 may proceed to generate and send a delivery notification 348, along with, potentially, receipt information 350 corresponding to the received information 346. The originating service provider 308 may then be responsible for forwarding the delivery notification 352 (representing the delivery notification 348) and the receipt information 354 (corresponding to the receipt information 350) to the originating mobile device 302.

In some implementations, and as illustrated in the example of FIG. 3, the delivery notification provider 102 may maintain a delivery notification log 356. The DN log 356 may be utilized to persist delivery notification data, e.g., for the message 306, the delivery notification 352, and the receipt information 354, to thereby provide long-term storage for information relating to the transmission of the message 306 and the generation and return of the delivery notification 352 and the receipt information 354.

For example, in some implementations of the delivery notification provider 102, as described in more detail below, the delivery notification provider 102 may utilize an in-memory database, such as the SAP HANA in-memory database product, in order to provide the type of high speed, high volume message identifier matching, and associated activities, provided by the delivery notification provider 102. Thus, in some implementations, data stored using such techniques need only be maintained for as long as maybe necessary to ensure that the delivery notification 352 and receipt information 354 have been delivered, or for some suitable time thereafter, before related data is aged out of the primary working of the delivery notification provider 102. For example, with reference back to FIG. 1, the message identifier repository 122 may have individual entries purged once a successful matching operation of the message identifier matching 124 is completed.

In contrast, the DN log 356 may be configured to provide longer term storage for data that may be stored within the message identifier repository 122, or otherwise in conjunction with the delivery notification provider 102. In this way, the DN log 356 may be utilized to provide analysis of data related to message delivery and delivery notification delivery. For example, the DN log 356 may be utilized to store one-way and round-trip times for various messages and associated delivery notifications. In this way, the delivery notification provider 102 may track its success in providing its intended function. Additionally, or alternatively, the delivery notification provider 102 may leverage data within the DN log 356 to provide additional services to one or both of the originating service provider 308 and the receiving service provider 330. Then, the service providers 308, 330 may utilize such reports or other data analytics provided by the delivery notification provider 102 using the DN log 356, in order to increase their respective network efficiency, customer satisfaction, or profitability.

Figure 4:
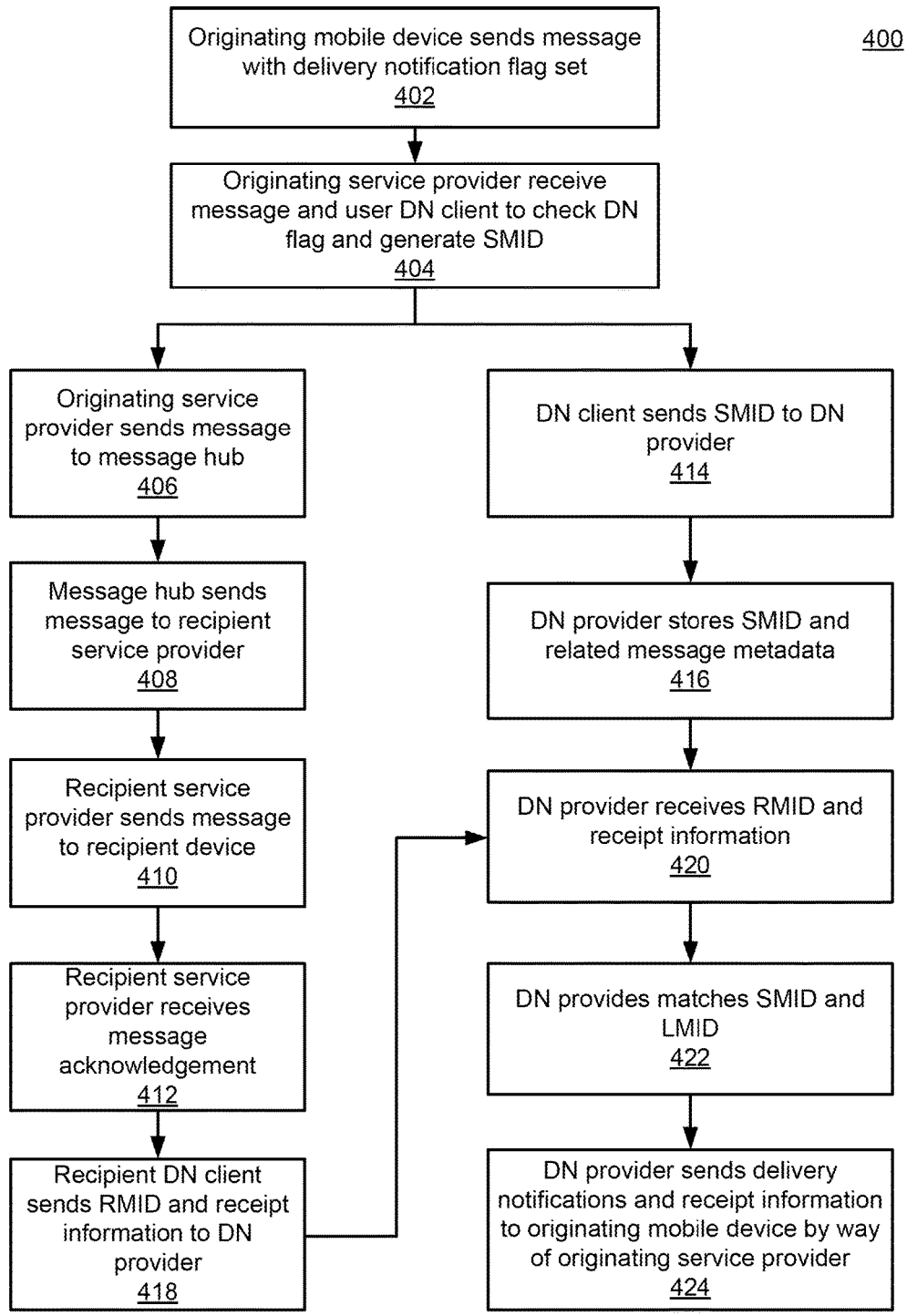
FIG. 4 is a flowchart illustrating a more detailed example implementation of the systems of FIGS. 1 and 3.

FIG. 4 is a flowchart 400 illustrating example operations of the system 300 of FIG. 3. In the example of FIG. 4, the originating mobile device 302 sends the message 306 with a delivery notification flag set (402). The message 306 is received by the originating service provider 308, and the DN flag inspector 312 may be used to check a status of the DN flag of the message 306, whereupon the DN client 310 generates the SMID 324 (404). In other words, as described, it would be appreciated that the originating service provider 308 is frequently receiving a large number of messages to be sent, from a large number of originating mobile devices. Since only some of these messages will include an active delivery notification flag, the DN flag inspector 312 serves as an initial filter for identifying such messages, and the DN client 310 is configured to send, for all such messages, a corresponding SMID, e.g., the SMID 324, to the delivery notification provider 102, using a delivery notification network path that is different from the message delivery network path of the message 306.

Specifically, the originating service provider 308 may proceed to send the message 314 to the message delivery hub 316 (406), while, in parallel, the DN client 310 sends the SMID 324 to the delivery notification provider 102 (414). In the example of FIG. 4, while the message delivery hub 316 proceeds to route the message 314 as message 328 to the receiving service provider 330 (408), the delivery notification provider 102 stores the SMID 324, along with any related message metadata (416). Meanwhile, the recipient service provider 330 for message 328 as message 332 to the receiving mobile device 334 (410), and then receives the message acknowledgement 336 from the receiving mobile device 334 (412).

Based on the acknowledgement (or, in the case of delivery failure, based on a non-receipt of the acknowledgement 336 within a designated time window), the DN client 338 of the receiving service provider 330 proceeds to send the RMID 344 and any receipt information 346 to the delivery notification provider 102 (418). At this time, the delivery notification provider 102 receives the RMID 344 and any receipt information 346 (420), and proceeds to match the received RMID 344 with the earlier-received SMID 324 (422).

The delivery notification provider 102 then sends the delivery notification 348 and any associated receipt information 350 to the originating mobile device 302 by way of the originating service provider 308, as illustrated in FIG. 3 with respect to the received delivery notification 352 and receipt information 354 (424). For example, the DN client 310 may provide additional functionality of forwarding the delivery notification 352 and the receipt information 354 to the originating mobile device 302.

Figure 5:
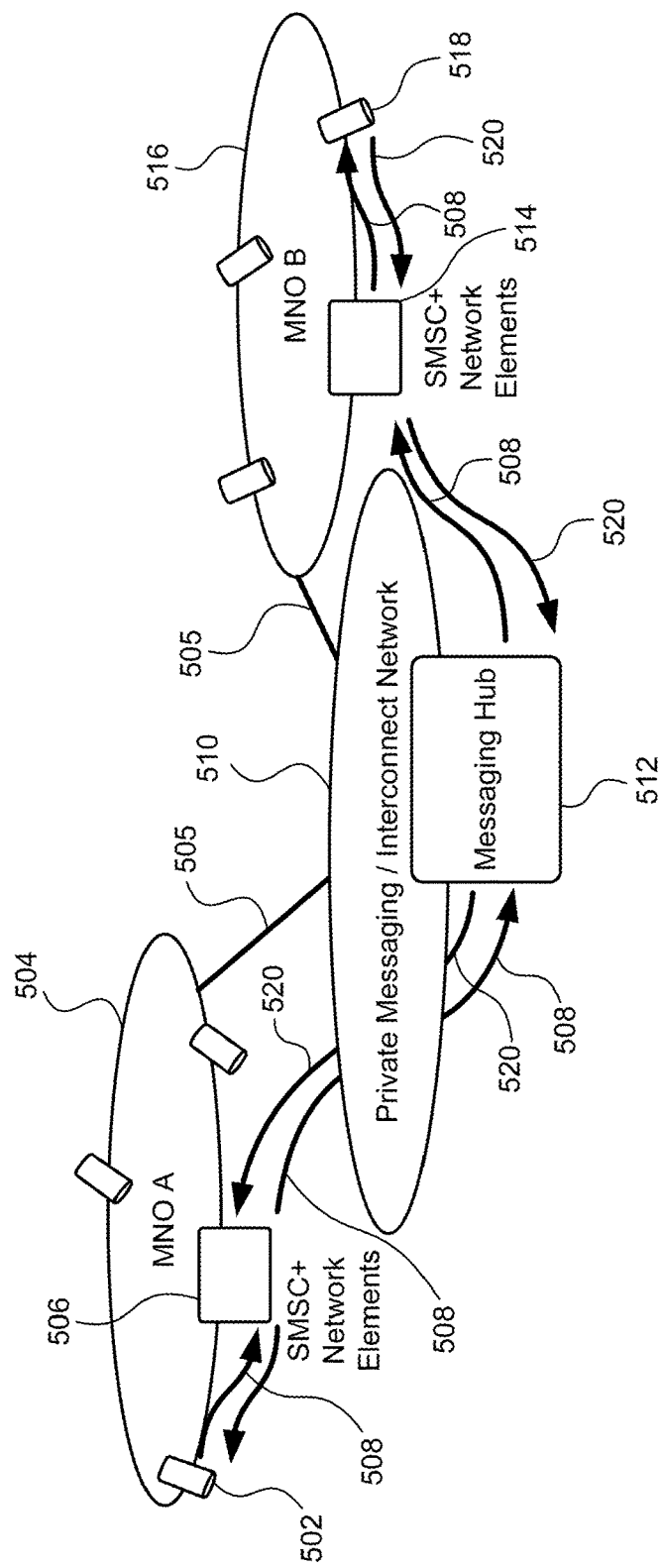
FIG. 5 is a block diagram illustrating message delivery paths for mobile device messaging systems.

By way of comparison, FIG. 5 illustrates a scenario in which a mobile device 502 of a plurality of mobile devices on a network 504 of a first mobile network operator (MNO A) sends a message by way of network infrastructure of the mobile network 504, illustrated as Short Message Service Center (SMSC) and network elements 506 in FIG. 5, using secure IP connections 505. Specifically, as shown, arrows identified as arrows 508 in FIG. 5 illustrate a message path of such a message through a private messaging/interconnect network 510, using an inter-provider messaging hub 512, corresponding generally to the message delivery hub 316 of FIG. 3. In this way, the messages traveling along the arrows 508 are sent to the corresponding SMSC and network elements 514 of a mobile network 516 of a different mobile network operator (MNO B), and ultimately to a mobile device 514 on the mobile network 516.

In order to send a delivery notification in this scenario, arrows 520 represent a message pathway traversing the message delivery network path of FIG. 5 in the opposite direction, flowing over essentially the same network route back to the originating device 502. As referenced above, and as illustrated in FIG. 5, message delivery+delivery notification in the example of FIG. 5 effectively doubles the processing requirement for a given message.

Figure 6:
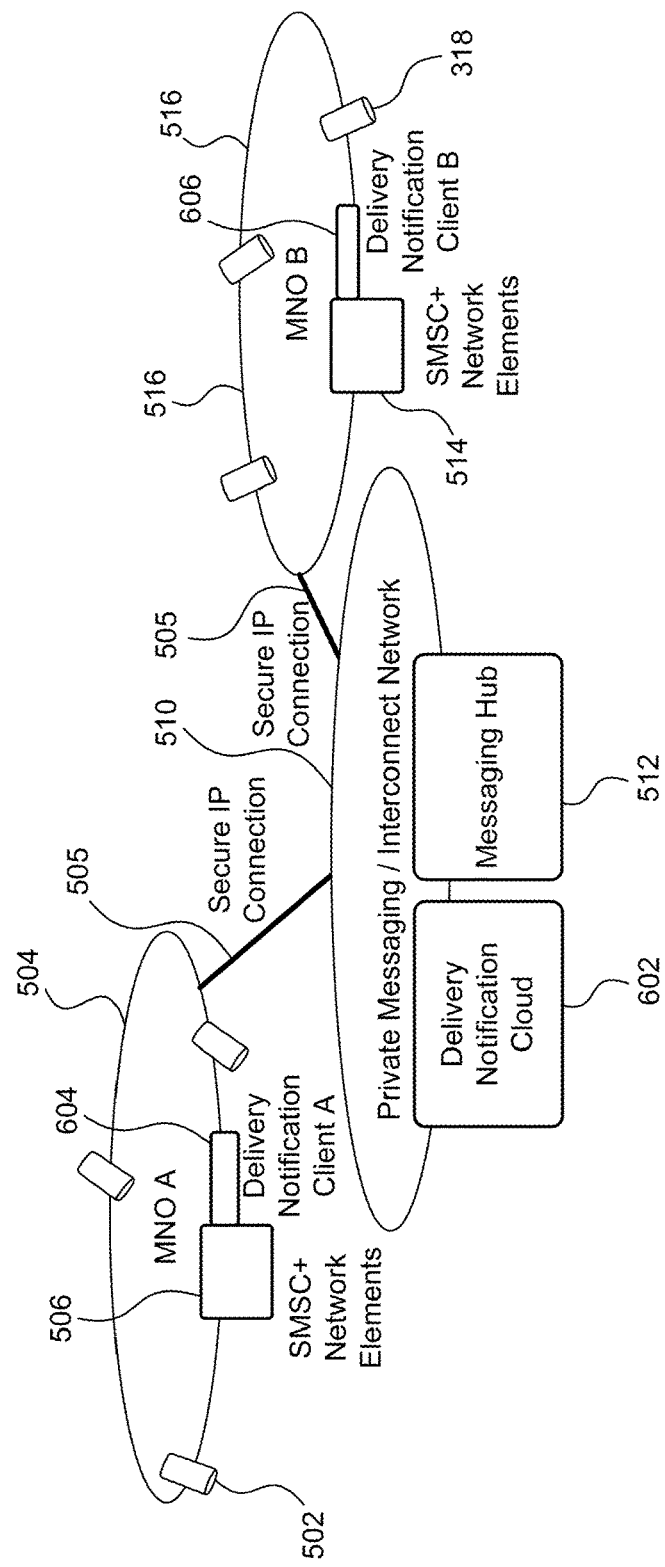
FIG. 6 is a block diagram of an example implementation of the systems of FIGS. 1 and 3, in the context of the mobile device messaging systems of FIG. 5.

In contrast, as shown in FIG. 6, an addition of a delivery notification cloud 602 and associated delivery notification clients 604 (at the mobile network 504) and a delivery notification client 606 (at the mobile network 516) enable the type of cloud-based delivery notification techniques described above with respect to FIGS. 1-4. The delivery notification clients 604, 606 also may be referred to as delivery notification probes, or just probes. In any case, the delivery notification client 604, 606 generally represent additional, low impact clients that act as MNO gateways between primary delivery notification cloud 602 processes and the MNO SMSC/messaging network elements 506, 514.

In some examples, the DN clients 604, 606 may be provided as APIs to the mobile network operators in question. As described with respect to FIG. 3, the delivery notification client 604 at the originating device 502 may implement a "post DN" posting function for sending a sent message notification (e.g., the SMID 324 of FIG. 3 to the delivery notification cloud 602). The delivery notification client 604 may then subscribe to the delivery notification cloud 602 to receive delivery notifications for sent messages, such as the delivery notification 352 of FIG. 3.

Of course, the delivery notification client 606 of FIG. 6 may be configured to act similarly to the DN client 338 of FIG. 3. Specifically, for example, the delivery notification client 606 may receive a message acknowledgement from a recipient mobile device 518, and provide a received message identifier and any associated receipt information, such as the RMID 344 and receipt information 346 of FIG. 3, back to the delivery notification cloud 602.

In the example of FIG. 6, all correlations between the messages and their delivery status are processed in the delivery notification cloud 602. As described, the delivery notification client 604 posts the corresponding SMID for the message being sent to the delivery notification cloud 602, perhaps as a short data packet. Information in the data packet may include, for example, the SMID, which may be generated by the SMSC/network element 506.

The delivery notification cloud 602 may then receive the data packet with the SMID, and, as described and illustrated below in more detail with respect to FIG. 7, may place the packet information on a transaction processing list. Upon receipt of the message at the destination MNO 516, the SMSC/network elements 514 of the MNO 516 posts a return packet to the delivery notification cloud 602, indicating that the message was received, and, in the example, referencing the original sent message ID provided by the delivery notification client 604. Accordingly, the RMID may be used by the delivery notification cloud 602 to match the original SMID, and thereafter post a message back to the originating MNO 504, indicating receipt of the message, whereupon the originating MNO 504 provides the result and indicator message back to the originating mobile device 502.

When the delivery notification clients 604, 606 are not posting indications that the message was sent or received, they may be in a status in which they are subscribed to incoming delivery indicators. The delivery notification 604, 606 also may be placed in a periodic polling mode for the main delivery notification cloud 602, to determine whether any related activity has occurred.

In these examples, the posting/pushing may be executed via HTTP, or the extensible markup language (XML), or using Session Initiation Protocol (SIP). In the previous examples, the different message IDs may be defined by the appropriate service provider/mobile network operator, e.g., the originating service provider/mobile network operator, and may act as the key for the message and the associated notification (e.g., RXH02130614150359810092). The SMID may include the originating mobile network operator identifier as a separate field within packets sent to the delivery notification cloud from the delivery notification client 604, or may generate a single sent message identifier which identifies the originating service provider/mobile network operator and individual message being sent.

With respect to the RMID return from the delivery notification client 606, the corresponding packet may include, together or separately, an identifier of the destination/recipient service provider/mobile network operator, an originating telephone number identifying the sending mobile device 502, the message ID of the original message, and a status code indicating a success, failure, or error in sending and receiving the message in question. In some cases, additional status information may be included, such as a reason for a failure/error (e.g., an indication of a full device memory at the receiving mobile device).

Figure 7:
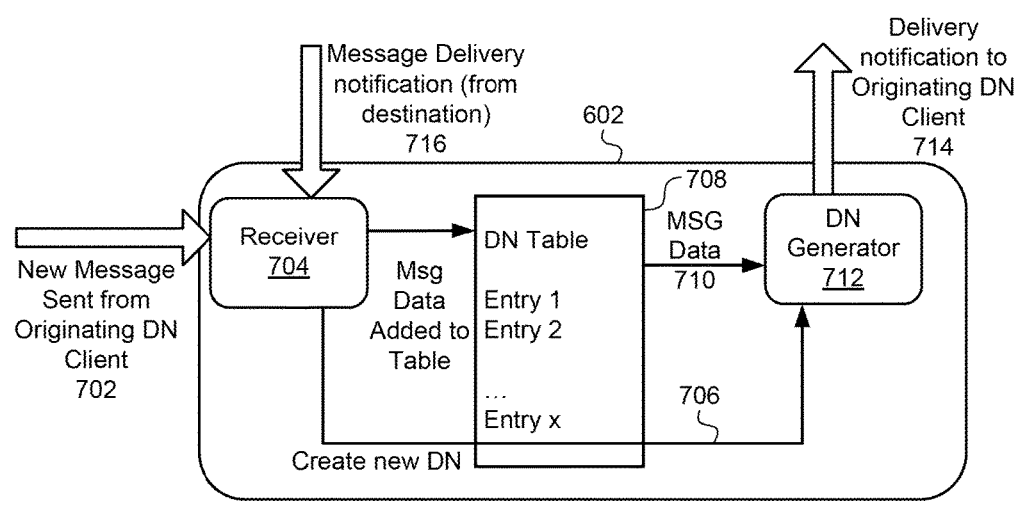
FIG. 7 is a block diagram of a message flow for generating delivery notifications.

FIG. 7 is a block diagram providing a more detailed example of a message flow within the delivery notification cloud 602 of FIG. 6. As referenced above, a new message sent from an originating DN client may be received (702) at a receiver 704 of the delivery notification cloud 602. The receiver has a process that serves as an internal traffic or routing agent, corresponding generally to the message identifier collector 120 of FIG. 1. The receiver 704 may proceed to create a new entry within a delivery notification table 708, which corresponds generally to the message identifier repository 122 of FIG. 1. As referenced above, the DN table 708 may be implemented using the SAP HANA or other in-memory correlation/processing engine, capable of maintaining millions or more of open transactions.

As explained, the DN table 708 may later receive a message from a destination service provider indicating delivery of the message in question (716), prompting a matching of the two message identifiers and associated command to create a new delivery notification in response thereto (706).

Accordingly, a DN generator 712 will proceed to search the DN table 708 for a corresponding entry, and may then use retrieved message data 710 to create a packet to send to the originating DN client (714), whereupon the entry may be removed from the DN table 602. The included entry of the DN table 708 may then be removed. As described, in some embodiments, a separate DN log 356, not illustrated in FIG. 7 but shown in the example of FIG. 3, may be used to provide additional data persistence, such as a final posting of a delivery notification and related information and metadata. In scenarios in which the DN cloud 602 and the messaging hub 512 are provided by a single provider, the DN generator 712 may also send an internal notification to the messaging hub 512, to indicate the final disposition of the message, whereupon logging may occur at the messaging hub 512.

Figure 8:
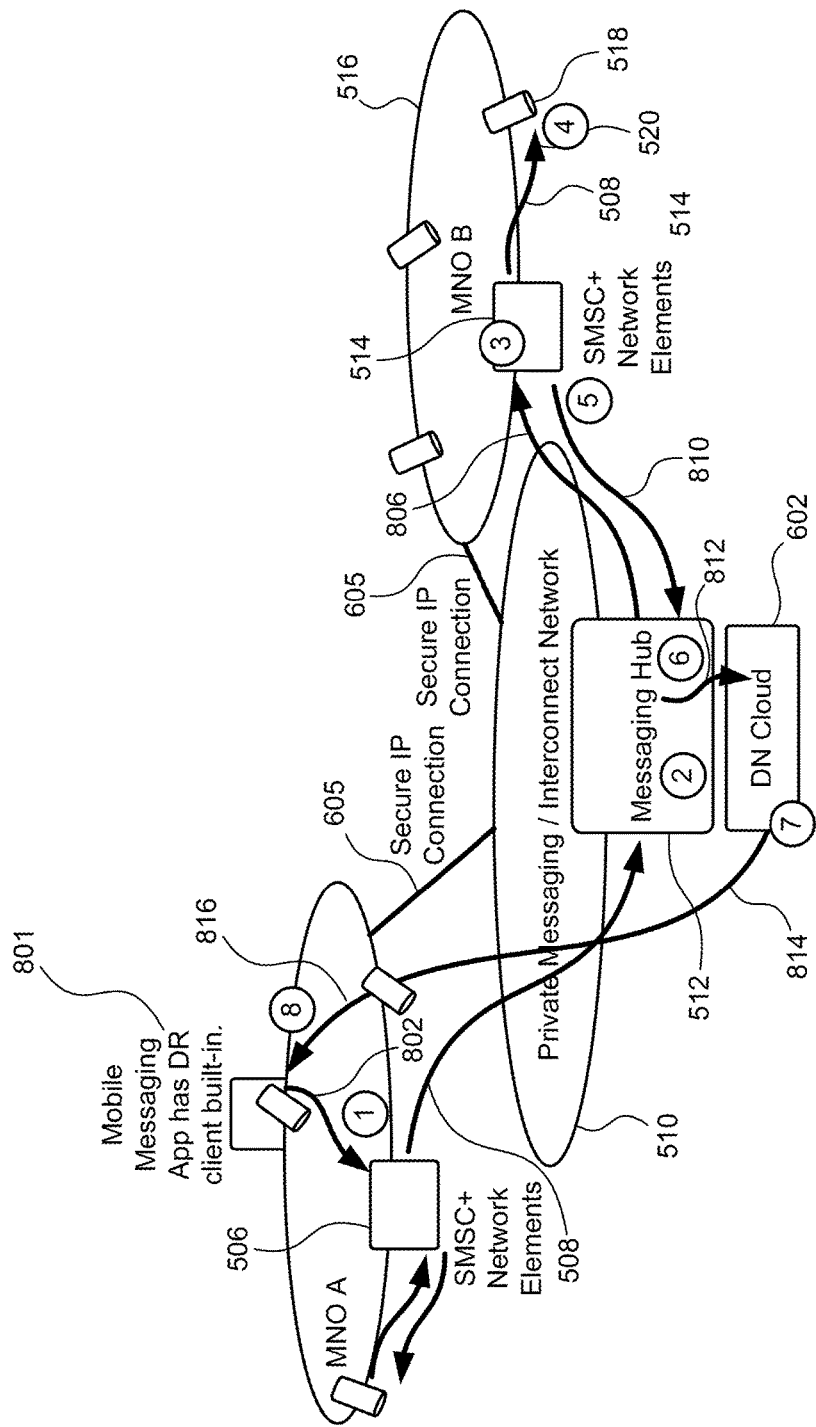
FIG. 8 is a block diagram of an alternative implementation of the systems of FIGS. 6 and 7.

FIG. 8 illustrates a different implementation, in which an API is incorporated into a mobile device messaging application to detect delivery notification packets. In this implementation, the delivery notifications are provided for a single MNO/service provider, and can be understood to represent a hybrid solution, using features of FIGS. 5 and 6.

In the scenario of FIG. 8, the originating message is sent from the originating mobile device to the relevant SMSC 506 (802). The message may be noted to be out of network, and thereafter received by the messaging hub 512 (804). The message is then forwarded to the destination SMSC 514 (806), which then delivers to the destination mobile device 518 (808). The SMSC 514 detects whether the delivery was successful to the mobile device 518, and sends a delivery notification, using the normal message delivery network path to the messaging hub 512 (810). In this scenario, the messaging hub 512 notifies the DN cloud 602 that a message was delivered (812). The DN cloud 602 then posts the notification (814), directly to the originating mobile device 801 (802), where the delivery notification may be displayed to the user of the mobile device 801. In this scenario, it is not necessary to include a DN client on the destination mobile network operator, as the mobile device messaging application installed on the mobile devices 801, 518 have the capability already built in.

Figure 9:
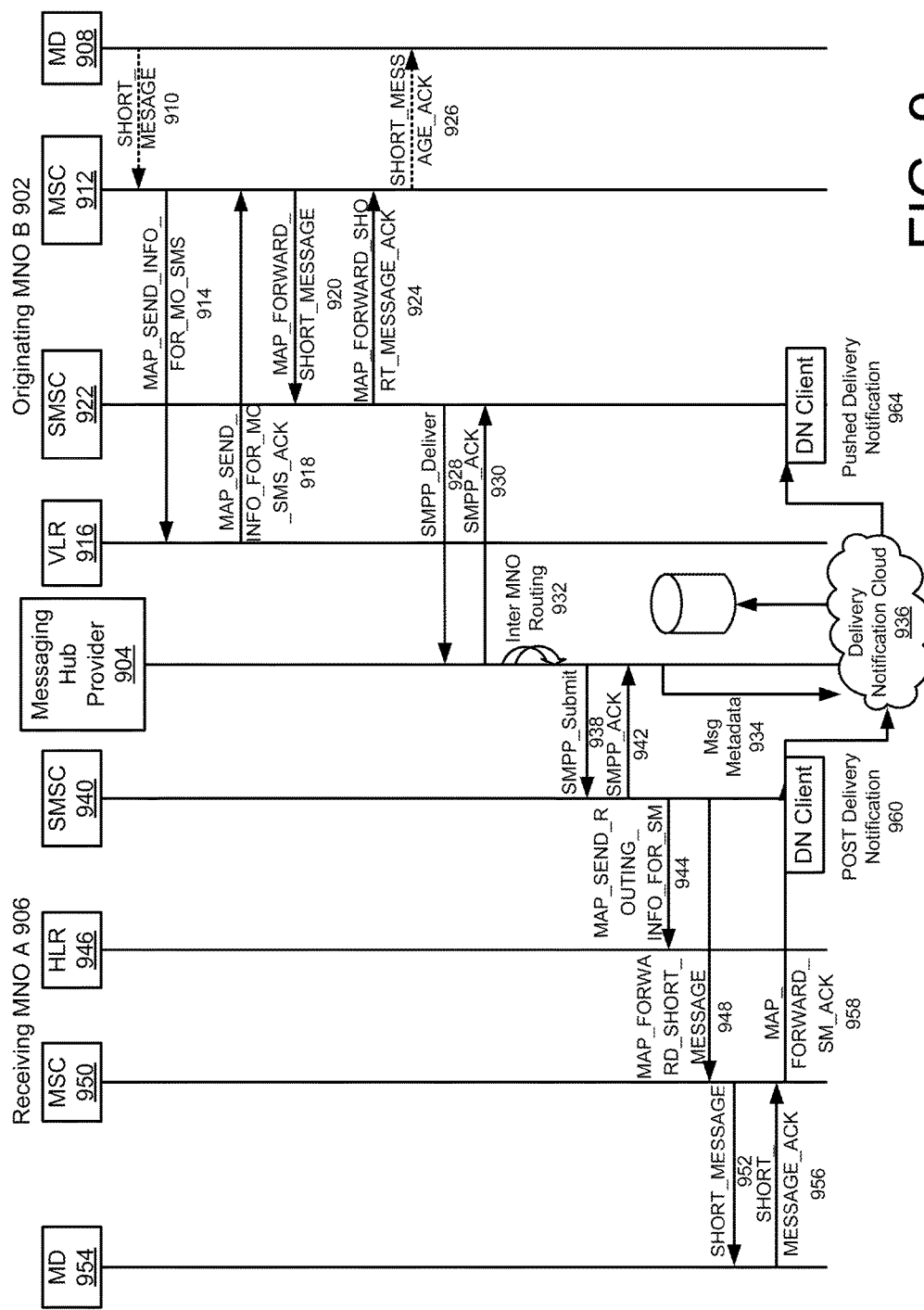
FIG. 9 is a timing diagram of an end-to-end inter-operator message exchange using the cloud-based delivery notification of FIG. 1.

FIG. 9 is a timing diagram illustrating a complete end-to-end inter-operator SMS message exchange using an implementation of the type of delivery notification cloud services described above with respect to FIGS. 1-8. In the example of FIG. 9, it is assumed that the operator's SMSC is modified to post the notification and then receive optional notifications pushed to it. The notification may also be posted to a logging server (962), as shown and described below. In the example, SMPP protocol may be used between the originating/recipient SMSC and the messaging hub providers; however, it will be appreciated that other protocols (e.g., Signaling System 7 (SS7)) may be used.

Thus, in the example of FIG. 9, an originating MNO 902 interacts with a messaging hub provider 904 to send messages to a receiving MNO 906. In the example, a mobile device 908 sends a message 910 to a Mobile Switching Center (MSC) 912. The MSC 912 sends a location request 914 to a Visitor Location Register (VLR) 916 to identify a SMSC 922, which returns a response 918 to the MSC 912. The MSC 912 forwards the messate 920 to the SMSC 922, which returns a message acknowledgement 924 to the MSC 912. The MSC 912 then provides a corresponding message acknowledgement 926 to the mobile device 908.

The SMSC 922 then sends an SMPP delivery notification 928 to the messaging hub provider 904, which returns an SMPP acknowledgment 930 to the SMSC 922. A messaging hub provider 904 provides its normal function of inter-MNO routing 932, while also sending message metadata 934, including the corresponding SMID for the short message 910 to the delivery notification cloud 936.

Then, the messaging hub provider 904 also sends an SMPP submit message 938 to the SMSC 940 of the MNO 906, which returns an acknowledgment thereof 942. The SMSC 940 sends routing information 944 to a Home Location Register (HLR) 946, and forwards the message to the MSC 950 (948). The MSC 950 forwards the message to the receiving mobile device 954 (952). The receiving mobile device 954 returns a message acknowledgement (956) to the MSC 950. The MSC 950 further returns a message acknowledgement 958 to a DN client 960 of the SMSC 940, which provides a posted delivery notification to the delivery notification cloud 936. As described, the delivery notification cloud 936 may log related information 962 using a DN log 962. Otherwise, the delivery notification cloud 936 matches the posted delivery notification with the earlier-received sent message identifier, and pushes a corresponding delivery notification to a DN client 964 at the SMSC 922. The resulting delivery notification may then be provided to the originating mobile device 908.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer program product, the computer program product being tangibly embodied on a non-transitory computer-readable storage medium and comprising instructions that, when executed, are configured to cause at least one processor to:
receive a sent message identifier for a message sent by an originating device over a message delivery network path that includes a first service provider providing mobile services to the originating device, the sent message identifier being received over a delivery notification network path that is different from the message delivery network path and that uses a first protocol;
receive, over the delivery notification network path, a received message identifier indicating receipt of the message at a recipient device over the message delivery network path, the message delivery network path also including a second service provider providing mobile services to the recipient device, and further including an inter-provider message exchange hub that mediates exchange of the message between the first service provider and the second service provider using an inter-provider communications protocol that is different from the first protocol;
and
send, based on the received message identifier and the sent message identifier, a delivery notification to the originating device using the first protocol, over the delivery notification network path and independently of the inter-provider communications protocol.

2. The computer program product of claim 1, wherein the instructions, when executed, are configured to cause the at least one processor to:
receive the sent message identifier from a delivery notification client configured to detect a delivery notification flag associated with the message and generate the sent message identifier.

3. The computer program product of claim 2, wherein the delivery notification client is installed at a service provider providing messaging services to the originating device.

4. The computer program product of claim 2, wherein the message delivery network path includes a message delivery hub which connects a first mobile service provider providing services to the originating device and a second mobile service provider providing services to the recipient device.

5. The computer program product of claim 1, wherein the instructions, when executed, are configured to cause the at least one processor to:
post a first entry for the sent message identifier to a message identifier repository;
post a second entry for the received message identifier to the message identifier repository; and
send the delivery notification based on the first entry and the second entry.

6. The computer program product of claim 1, wherein the received message identifier is received from a delivery notification client configured to detect an acknowledgment from the recipient device and post the received message identifier over the delivery notification network path in response thereto.

7. The computer program product of claim 6, wherein the delivery notification client is installed at a service provider providing messaging services to the recipient device.

8. The computer program product of claim 1, wherein the received message identifier is received in conjunction with receipt information characterizing actions of a user at the recipient device in conjunction with a viewing of the message at the recipient device.

9. The computer program product of claim 1, wherein the instructions, when executed, are configured to cause the at least one processor to:
persist message metadata characterizing the delivery notification and the message to a delivery notification log; and
generate analytics and reports characterizing delivery notifications and associated messages, including the delivery notification and the message.

10. The computer program product of claim 1, wherein a table storing the sent message identifier and the received message identifier is implemented using an in-memory database.

11. A computer-implemented method for executing instructions stored on a non-transitory computer readable storage medium, the method comprising:
receiving a sent message identifier for a message sent by an originating device over a message delivery network path that includes a first service provider providing mobile services to the originating device, the sent message identifier being received over a delivery notification network path that is different from the message delivery network path and that uses a first protocol;
receiving, over the delivery notification network path, a received message identifier indicating receipt of the message at a recipient device over the message delivery network path, the message delivery network path also including a second service provider providing mobile services to the recipient device, and further including an inter-provider message exchange hub that mediates exchange of the message between the first service provider and the second service provider using an inter-provider communications protocol that is different from the first protocol;
and
sending, based on the received message identifier and the sent message identifier, a delivery notification to the originating device using the first protocol, over the delivery notification network path and independently of the inter-provider communications protocol.

12. The method of claim 11, comprising
posting a first entry for the sent message identifier to a message identifier repository;
posting a second entry for the received message identifier to the message identifier repository; and
send the delivery notification based on the first entry and the second entry.

13. The method of claim 11, wherein the message delivery network path includes a message delivery hub which connects a first mobile service provider providing services to the originating device and a second mobile service provider providing services to the recipient device.

14. A system comprising:
at least one processor; and
instructions recorded on a non-transitory computer-readable medium, and executable by the at least one processor, the system including:
a message identifier collector coupled to the at least one processor to collect message identifiers identifying sent messages having been sent by originating devices and identifying received messages of the sent messages that have been received at corresponding recipient devices;

a message identifier coupled to the at least one processor to identify a sent message identifier for a sent message of the sent messages and a received message identifier for a corresponding received message of the received messages at a corresponding recipient device; and a delivery notification generator coupled to the at least one processor to send, based on the sent message identifier and the received message identifier, a delivery notification to an originating device of the originating devices that originally sent the sent message, thereby indicating receipt of the message at the corresponding recipient device, wherein a delivery notification network path along which the message identifiers and the delivery notification are sent is different from a message delivery network path along which the message is sent, and further wherein the delivery notification network path uses a first protocol and the message delivery network path includes a first service provider providing mobile services to the originating devices and, a second service provider providing mobile services to the recipient devices, and an inter-provider message exchange hub that mediates exchange of the messages between the first service provider and the second service provider using an inter-provider communications protocol that is different from the first protocol, and the delivery notification is sent to the originating device using the first protocol, over the delivery notification network path and independently of the inter-provider communications protocol.

15. The system of claim 14, wherein the message identifier collector is coupled to the at least one processor to receive the sent message identifier from a delivery notification client configured to detect a delivery notification flag associated with the sent message and generate the sent message identifier.

16. The system of claim 15, wherein the delivery notification client is installed at a first service provider providing messaging services to the originating device.

17. The system of claim 16, wherein the received message identifier is received from a delivery notification client coupled to the at least one processor to detect an acknowledgment from the recipient device and post the received message identifier over the delivery notification network path in response thereto.

18. The system of claim 17, wherein the delivery notification client is installed at a second service provider providing messaging services to the recipient device.

19. The system of claim 14, wherein the message delivery network path includes a message delivery hub which connects a first mobile service provider providing services to the originating device and a second mobile service provider providing services to the recipient device.

20. The system of claim 14, wherein the message identifier is coupled to the at least one processor to send a second delivery notification, for a second sent message, to a second originating device of the originating devices, upon failure to receive a corresponding second received message identifier for a second corresponding recipient device, the second delivery notification indicating a failed status of the second sent message.

* * * * *